Sept. 24, 1946.　　　O. J. POUPITCH　　　2,408,340
FASTENING DEVICE
Filed Feb. 14, 1945
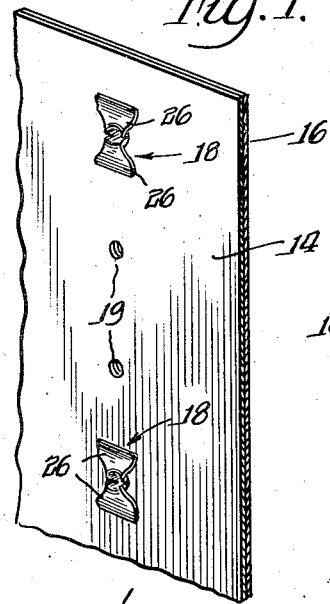
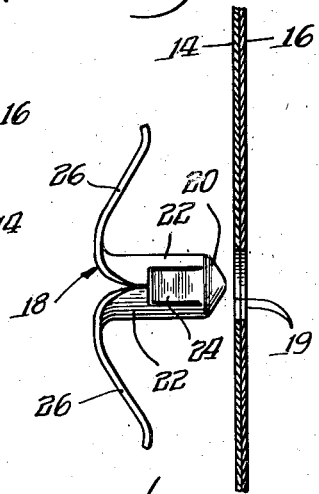
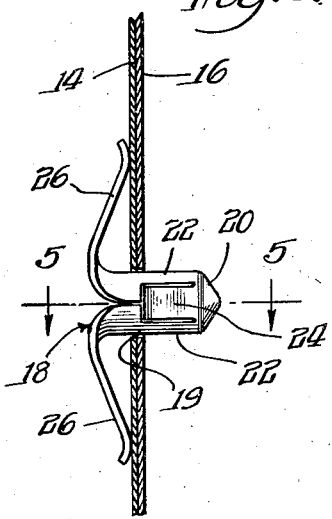
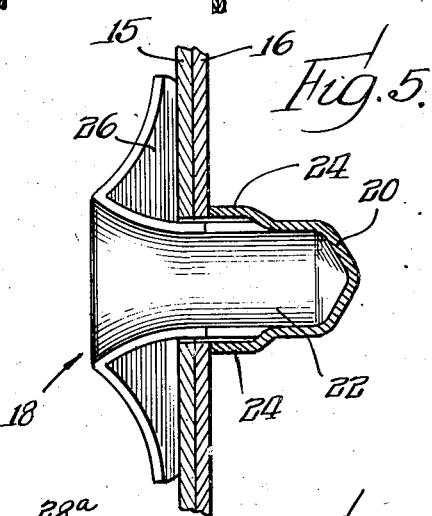
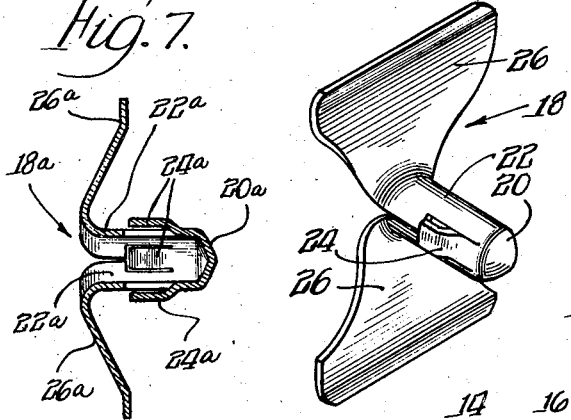
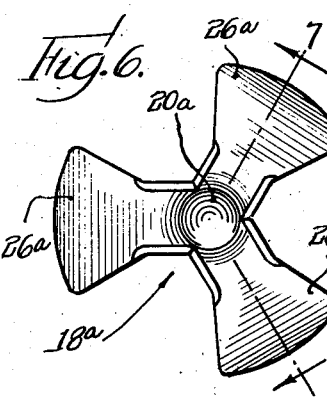
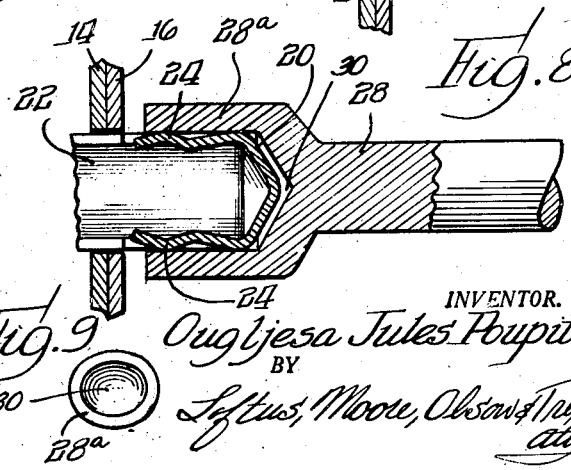
INVENTOR.
Ougljesa Jules Poupitch
BY
Loftus, Moore, Olson & Trexler
Attys.

Patented Sept. 24, 1946

2,408,340

UNITED STATES PATENT OFFICE 2,408,340

FASTENING DEVICE

Ougljesa Jules Poupitch, Chicago, Ill., assignor to Illinois Tool Works, Chicago, Ill., a corporation of Illinois Application February 14, 1945, Serial No. 577,762

7 Claims. (Cl. 85—40)

This invention relates to fastening devices and it has for its object the provision of a new and improved form and arrangement of parts in a device of this type which is particularly adapted to be made from sheet metal.

The invention contemplates a fastener having very effective holding power, and capable of being applied and removed over and over again without impairing its operative effectiveness. The invention also contemplates a fastener whereby highly effective results may be obtained from the standpoint of ease and speed of application to the work and subsequent removal therefrom, from the standpoint of lightness of weight, from the standpoint of ease and cheapness of manufacture, and also from the standpoint of adaptability of the device for use at different points and under different conditions with respect to the thickness of the parts to be connected.

The improved device by which the several objects have been attained comprises a part stamped from a piece of sheet metal and so shaped as to provide the maximum strength consistent with simplicity of stamping operations, so as to provide a wide margin of take-up relying upon the resiliency of the sheet metal of the device, and so as to provide adequate latching of the holding tongues with the face of one of the plates or other parts being held, while at the same time providing for easy displacement of the tongues from holding position by the use of suitable tools whenever desired. The device is preferably formed from sheet metal stock, with its body portion in tubular form so as to provide a maximum of strength, with laterally extending arms or wings of substantial length standing normally in acute angled relation to the body so as to provide resilient take-up through a wide range, and with comparatively short latching tongues of slightly bowed form positioned between the body portions, the ends of the latching tongues being normally positioned at a substantial distance from the body portion but with the bowed portions of the tongues at even greater distance whereby the holding end portions of the tongues may be displaced effectively from holding position by pressure on the bowed portions.

It is another object of the invention to improve devices of this type in sundry details hereinafter pointed out. The preferred means by which the several objects have been attained are illustrated in the accompanying drawing, in which Fig. 1 is a perspective view of two plates connected by two of the improved devices embodying the invention.

Fig. 2 is a side view of one of the improved fastening devices ready to be inserted through registering openings in two plates to be connected together.

Fig. 3 is a view similar to Fig. 2 but showing the fastening device in operative position.

Fig. 4 is a perspective view of the improved fastening device.

Fig. 5 is a central vertical sectional view taken substantially at the line 5—5 of Fig. 3.

Fig. 6 is a face view of a fastening device of modified form.

Fig. 7 is a sectional view taken substantially at the line 7—7 of Fig. 6.

Fig. 8 is a central sectional view through a fastening device partly broken away, shown in position in registering openings in two plates, with a removing tool in position on the fastening device for releasing it from the plates; and Fig. 9 is an end view of the tool shown in Fig. 8.

Referring now to Figs. 1 to 5 inclusive, in which corresponding parts are indicated by the same reference characters, two plates or work pieces 14 and 16 are connected together in face to face relationship by two of the improved fastening devices 18, such fastening devices being inserted through registering openings 19 in the plates, as best shown in Figs. 2 and 3.

The improved fastening device is preferably formed from a strip of sheet metal pressed into shape to provide a tubular shank having a resilient head formed thereon at one end portion comprising two or more resilient arms or wings turned outwardly and backwardly. The middle portion of the strip is preferably pressed into the form of a solid unbroken cup portion 20 having a high degree of strength, with rounded complementary body portions 22 extending from the edge of the cup and positioned in mutually reinforcing engagement with each other with the edge portions of one engaging the edge portions of the other. Between the body portions 22, resilient tongues 24 are provided, also extending from the edge of the cup 20. The body portions 22 are marginally notched for accommodating the tongues 24.

At their free ends, the body portions 22 are provided with arms or wing 26 extending outwardly and backwardly into position to engage the face of one of the work plates. In the preferred arrangement, the tongues 24 are bent outwardly so that the free ends of the tongues are normally positioned outwardly beyond the periphery of the shank, as best shown in Fig. 5. The diameter of the shank is substantially equal to the diameter of the openings 19. The arrangement is such that when the shank of the device 18 is inserted into registering openings 19 in the plates 14 and 16, the tongues 24 are forced to permit passage of the shank and as the free extremities of the tongues clear the work piece 16 they spring or snap outwardly into latched engagement with the face of the plate 16, as shown in said Fig. 5. The arms or wings 26 are normally sprung rearwardly, toward the right in Fig. 2, to a point substantially coincident with the transverse plane which includes the ends of the tongues 24. Thus the arms 26 upon engaging the plate 14 are adapted to yield to the necessary extent for permitting the tongues 24 to clear the face of the plate 16 and snap outwardly into latching position. After the insertion of the fastener into operative holding position, the wings or arms 26 hold the ends of the tongues 24 securely against the face of the plate 16. The outer or free ends of the arms 26 are broad to afford strength and provide an appreciable bearing surface. As is best shown in Figs. 2 and 3, the outer end portions of the arms are curved slightly to provide rounded bearing surfaces which preclude scratching or disfigurement of the work pieces.

While the present invention is directed to the fastening device per se, it is of interest to note that the device is constructed so as to facilitate the use of a tool for releasing the fastener. Such a tool is illustrated in Figures 7 and 8, and comprises a shank 28, having an enlarged head 28a thereon, provided with a socket 30 therein of substantially elliptical form. The size of the socket 30 is preferably such that the major diameter thereof will fit over the shank and tongues of the fastener in one position without affecting the position of the tongues, and such that when the tool is given rotary movement through ninety degrees the tongues are cammed inwardly for freeing them from the face of the plate Fig. 8. When the releasing tool has been rotated to the position shown in Fig. 8, the resilient arms or wings 26 function to urge the shank of the fastener out of the registering apertures in the work plates. Thus the wings 26 serve to automatically urge the fastener shank toward its released position. If desired, the spring action of the arms 26 may be such as to completely dislodge the fastener from the registering apertures.

In Figs. 6 and 7, a modified form of device 18a is shown comprising three resilient wings or arms 30 in lieu of the arms 26 of the first described construction, and comprising three latching tongues 24a. In this modified arrangement, the entering end portion of the shank is in the form of a solid unbroken cup 20a and the tongues 24a are struck out from the body or shank portions. The three sections which comprise the body present a tubular shank similar to the structure of Figs. 1 to 5 inclusive. The device 18a provides an equalized three point suspension or engagement as distinguished from the two point engagement of the wings 26 of the device 18, thus in instances where it is desirable to more uniformly distribute or apply clamping pressure, the wing arrangement of the device 18a is preferable.

By the improved construction as illustrated and described, a very sturdy structure is provided. With the end of the shank in the form of a solid cup of tapered form, the shank is very easily inserted into position, and a maximum of strength is attained. The integral form of the end portion of the shank, with the body portions extending from such integral portion and mutually reinforced against collapse inwardly, insures that the parts shall be held strongly in operative position so as to obtain a high degree of strength in proportion to the weight of the material employed. Not only does the closed end construction of the fastener shank provide added strength, but it also enhances the appearance of the shank. In other words, it presents a fastener shank having a finished appearance. Also the closed extremity of the shank makes it possible to locate the base of each tongue 24 closer to the entering end of the shank. This makes it possible to employ relatively long tongues which have the required degree of resiliency essential to ease and efficiency in operation. Also the closed extremity positively insures against injuries, so often experienced when sharp entering edges or corners are employed on a fastener. By having the shank of tubular construction with the edges of each body portion 22 arranged in abutting relation the device possesses very high resistance to shear stresses. It will also be apparent that while one form of releasing tool is disclosed, namely, a tool with an elliptical socket, other forms of sockets may be employed which upon rotation will cause the tongues 24 to be cammed inwardly.

While the form of device as shown and described is preferred, the invention is not to be limited to such form and arrangement except so far as the claims may be so limited, it being understood that changes might well be made without departing from the spirit of the invention.

What is claimed is:

1. A tension applying hollow rivet formed complete from a single strip of sheet metal, comprising a tubular shank having a solid end portion formed from the middle part of the strip and having rounded complementary body portions positioned side by side in mutually reinforcing edge to edge engagement with each other, axially resilient head portions formed from the end parts of the blank turned outwardly and backwardly, and inwardly displaceable latching means normally terminating in outwardly spaced relationship to the periphery of the shank, said latching means cooperatively disposed with respect to said resilient head portions to effect automatic gripping of a workpiece between said resilient head portions and latching means as an incident to telescopic association of the tubular shank and a work aperture.

2. A tension applying hollow rivet formed complete from a single piece of sheet metal, comprising a tubular shank having one end portion pressed into the form of a solid unbroken cup with rounded complementary body portions extending from the edge of the cup and in mutually reinforcing edge to edge engagement with each other, inwardly displaceable latching means carried by said shank and normally terminating in outwardly spaced relationship to the periphery of the shank, and axially resilient arms turned outwardly and backwardly into oblique position at the opposite end portion of said shank serving as a resilient head for the device, said latching means cooperatively disposed with respect to said resilient arms to effect automatic gripping of a workpiece between said resilient arms and latching means as an incident to telescopic association of the tubular shank and a work aperture.

3. A tension applying hollow rivet formed complete from a single strip of sheet metal, comprising a tubular shank having a solid end portion formed from the middle part of the strip and having rounded complementary body portions positioned side by side in mutually reinforcing edge to edge engagement with each other, axially resilient head portions formed from the end parts of the blank turned outwardly and backwardly, and inwardly displaceable latching means bowed outwardly at their intermediate portions with their engaging ends in outwardly spaced relationship to the periphery of the shank, said latching means cooperatively disposed with respect to said resilient head portions to effect automatic gripping of a workpiece between said resilient head portions and latching means as an incident to telescopic association of the tubular shank and a work aperture.

4. A tension applying hollow rivet formed complete from a single piece of sheet metal, comprising a tubular shank having one end portion pressed into the form of a solid unbroken cup with rounded complementary body portions extending from the edge of the cup and in mutually reinforcing edge to edge engagement with each other, inwardly displaceable latching means in the form of tongues extending from the edge of the cup between said body portions and normally terminating in outwardly spaced relationship to the periphery of the shank, and resilient arms extending outwardly and backwardly from the ends of the body portions, the free extremities thereof providing axially resilient head portions for the device, said latching means cooperatively disposed with respect to said resilient arms to effect automatic gripping of a workpiece between said resilient arms and latching means as an incident to telescopic association of the tubular shank and a work aperture.

5. A tension applying hollow rivet formed complete from a single piece of sheet metal comprising a tubular shank adapted for insertion within the aperture of a workpiece, inwardly displaceable latching means formed on said shank normally projecting beyond the periphery thereof but capable of being flexed inwardly when telescopically associated with an aperture conforming substantially in size with the cross section of the tubular shank, and resilient arms extending laterally from said shank to provide resilient head portions, said arms extending outwardly and backwardly toward the entering end of the shank and cooperatively disposed with respect to said latching means so as to effect resilient gripping of a workpiece between said arms and said latching means as an incident to telescopic association of the tubular shank with a work aperture.

6. A tension applying hollow rivet as set forth in claim 5 wherein the resilient arms extend laterally a distance which is appreciably greater than the diameter of the tubular shank whereby to increase the resiliency of said arms.

7. A tension applying hollow rivet as set forth in claim 5 wherein the resilient arms are appreciably wider at their free extremities than at their inner extremities to provide increased bearing surface.

OUGLJESA JULES POUPITCH.